US012770600B2

(12) United States Patent
Seto et al.

(10) Patent No.: US 12,770,600 B2
(45) Date of Patent: Oct. 20, 2026

(54) SOUNDPROOF MEMBER

(71) Applicant: Sumitomo Riko Company Limited, Aichi (JP)

(72) Inventors: Nobuyoshi Seto, Aichi (JP); Toshiki Matsuoka, Aichi (JP); Koji Tomiyama, Aichi (JP); Kazuyoshi Onishi, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 197 days.

(21) Appl. No.: 18/675,099

(22) Filed: May 27, 2024

(65) Prior Publication Data

US 2025/0104682 A1 Mar. 27, 2025

Related U.S. Application Data

(63) Continuation of application No. PCT/JP2023/034983, filed on Sep. 26, 2023.

(51) Int. Cl.
*G10K 11/16* (2006.01)
*B60R 13/08* (2006.01)

(52) U.S. Cl.
CPC .......... *G10K 11/16* (2013.01); *B60R 13/0838* (2013.01)

(58) Field of Classification Search
CPC ............................ G10K 11/16; B60R 13/0838
See application file for complete search history.

(56) References Cited

U.S. PATENT DOCUMENTS

| | | | | |
|---|---|---|---|---|
| 12,098,714 B2 * | 9/2024 | Kato | .................... | F04B 39/0033 |
| 2018/0268797 A1 * | 9/2018 | Lowry | ................. | G10K 11/002 |
| 2022/0225020 A1 * | 7/2022 | Misulia | .................. | H04R 3/005 |
| 2024/0331675 A1 * | 10/2024 | Kobayashi | ............. | B65D 51/24 |

FOREIGN PATENT DOCUMENTS

| | | |
|---|---|---|
| JP | 2007114617 | 5/2007 |
| JP | 2007255190 | 10/2007 |
| JP | 2021011091 | 2/2021 |

OTHER PUBLICATIONS

"Office Action of Japan Counterpart Application", issued on Oct. 10, 2025, with English translation thereof, p. 1-p. 5.
"Search Report of Europe Counterpart Application", issued on Apr. 10, 2025, p. 1-p. 7.

* cited by examiner

*Primary Examiner* — Forrest M Phillips
(74) *Attorney, Agent, or Firm* — JCIPRNET

(57) ABSTRACT

A soundproof member is capable of being lightweight and simplifying the manufacturing process.
The soundproof member which covers an object includes a sound absorbing body molded from foamed resin and a cover body molded from foamed resin. Multiple fitting concave units are provided on a circumferential side surface of the sound absorbing body, and multiple fitting convex units are provided on a side wall of the cover body. The sound absorbing body and the cover body are integrated by fitting the fitting concave units and the fitting convex units.

6 Claims, 6 Drawing Sheets

SOUNDPROOF MEMBER

CROSS-REFERENCE TO RELATED APPLICATION

This application is a continuation of PCT International Application No. PCT/JP2023/034983, filed on Sep. 26, 2023. The above application is hereby expressly incorporated by reference, in its entirety, into the present application.

TECHNICAL FIELD

The disclosure relates to a soundproof member.

DESCRIPTION OF RELATED ART

Patent Literature 1 (Japanese Patent Application Laid-Open No. 2007-255190) discloses an engine cover, which includes a urethane sound absorbing unit formed by covering the lower surface of a cover body made of synthetic resin at a position facing a pair of cylinder heads with urethane foam resin; and a PET sound absorbing unit formed by covering the lower surface of the cover body at a position facing the intake manifold with a PET nonwoven fabric. The urethane sound absorbing unit is formed by molding urethane foam resin on the lower surface of the cover body.

Since the engine cover described above has a cover body made of synthetic resin, the weight of the entire cover increases in proportion to the size of the engine cover. In particular, in the case of a large engine cover, the work load when assembling the cover on the vehicle becomes large. In addition, since the urethane sound absorbing unit is molded with urethane foam resin on the lower surface of the cover body, manufacturing equipment for the resin raw material to manufacture the cover body and manufacturing equipment for the foam raw material that foam-molds the urethane sound absorbing unit on the cover body are required, and the manufacturing process becomes complicated.

Therefore, the disclosure provides a soundproof member capable of being lightweight and simplifying the manufacturing process.

SUMMARY

An aspect of the disclosure provides a soundproof member that covers an object having a concave unit on an outer surface thereof, and the soundproof member includes a sound absorbing body and a cover body. The sound absorbing body is a plate-shaped member made of foamed resin and includes a first surface which has a convex unit accommodated in the concave unit of the soundproof member and covers an outer surface of the object, a second surface which is a surface opposite to the first surface, and a circumferential side surface which connects the first surface and the second surface and is an inclined surface that slopes so that the first surface falls within a projection range of the second surface when viewed from the second surface side. The cover body is a concave member made of foamed resin and includes a bottom unit which covers the second surface of the sound absorbing body and a side wall which stands upright from an outer edge of the bottom unit toward the first surface side of the sound absorbing body so as to slope outward in a surface direction of the sound absorbing body, and surrounds the circumferential side surface of the sound absorbing body. Multiple fitting concave units that open outward in the surface direction of the sound absorbing body and communicates in a thickness direction of the sound absorbing body are provided at predetermined intervals in a circumferential direction on the circumferential side surface of the sound absorbing body. Multiple fitting convex units that protrude inward in the surface direction of the sound absorbing body and continues in the thickness direction of the sound absorbing body are provided at positions facing the fitting concave units in the circumferential direction on an inner surface of the side wall of the cover body.

According to the disclosure, since the sound absorbing body and the cover body constituting the soundproof member are made of foamed resin, the overall weight can be reduced. Further, even if the soundproof member becomes larger, the burden of assembly work on a vehicle or the like can be reduced.

According to the above configuration, on the circumferential side surface of the sound absorbing body constituting the soundproof member, multiple fitting concave units that open outward in the surface direction of the sound absorbing body and communicate in the thickness direction of the sound absorbing body in which the sound absorbing body is accommodated in the cover body are provided at predetermined intervals in the circumferential direction. Further, on the inner surface of the side wall of the cover body constituting the soundproof member, multiple fitting convex units that protrude inward in the surface direction of the sound absorbing body and continues in the thickness direction of the sound absorbing body are provided in the circumferential direction. Since the fitting concave units and the fitting convex units are provided at positions facing each other in the circumferential direction, positioning during assembly is facilitated. Furthermore, since the fitting concave units and the fitting convex units can be integrated by fitting each other, manufacturing by a simple method can be attainable. Further, depending on the specifications, the sound absorbing body and the cover body can be manufactured by using the same manufacturing equipment and changing the mold or foaming raw material, so that the manufacturing process can be simplified.

DESCRIPTION OF EMBODIMENTS

1. Overall Configuration of Soundproof Member 1

Figure 1:
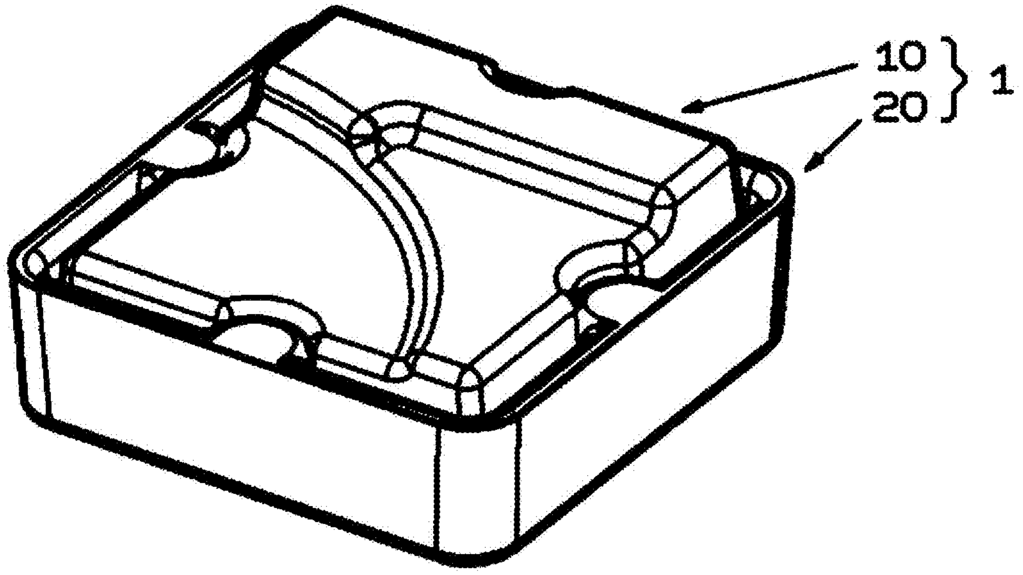
FIG. 1 is a perspective view of a soundproof member.

The configuration of an example of a soundproof member 1 will be described with reference to FIG. 1. The soundproof member 1 covers an object (not shown) and prevents transmission of sound and vibration generated from the object. The object is, for example, a motor or engine that is a power source of a vehicle, an intake manifold, an air compressor, or the like.

The soundproof member 1 is formed into a plate shape as a whole. In the embodiment, the soundproof member 1 has a substantially square shape in plan view. The soundproof member 1 is integrated by covering a plate-shaped sound absorbing body 10 with a concave cover body 20. In other words, in the soundproof member 1, the plate-shaped sound absorbing body 10 is accommodated in the concave cover body 20, and is integrated with the sound absorbing body 10 in a state where a surface thereof is exposed. Note that the soundproof member 1 can have any shape depending on the shape of the object and the range to be covered.

The soundproof member 1 is provided with, for example, a concave engagement member (not shown) such as a grommet that is engaged with a convex engagement member (not shown) such as a pin provided on the object, and is fixed to the object by engagement of the engagement members or the like.

2. Components of Soundproof Member 1

The components of the soundproof member 1 will be described with reference to FIGS. 2 to 9. The soundproof member 1 includes the sound absorbing body 10 and the cover body 20. The sound absorbing body 10 is a member that is placed on the outer surface of an object and mainly prevents transmission of sound and vibration generated from the object. The cover body 20 is a member that accommodates the sound absorbing body 10. The cover body 20 covers a side of the sound absorbing body 10 in an exposed state, prevents the transmission of sound and vibration generated from the object together with the sound absorbing body 10, protects the sound absorbing body 10 from a flying object, and forms a design surface of the soundproof member 1.

Figure 2:
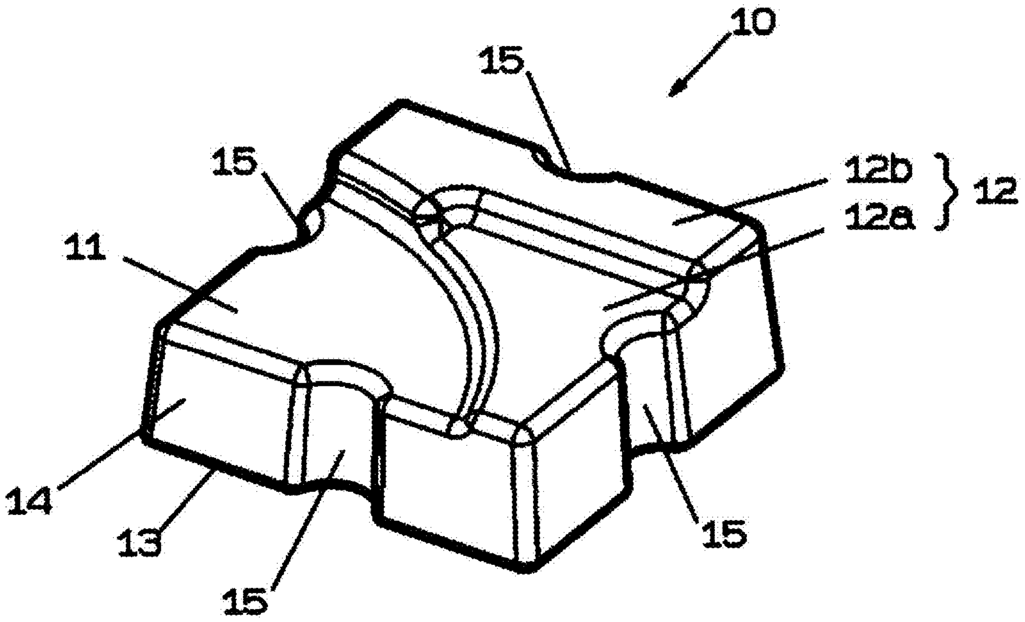
FIG. 2 is a perspective view of a sound absorbing body.
Figure 3:
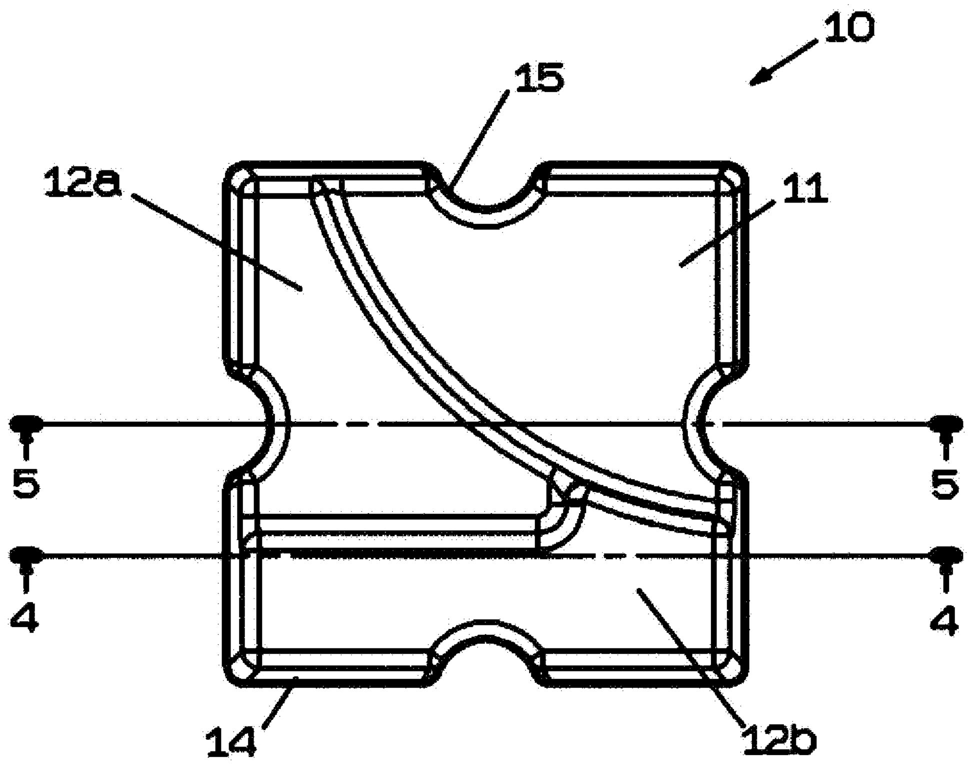
FIG. 3 is a plan view of the sound absorbing body.

As shown in FIG. 2, the sound absorbing body 10 is formed into a plate shape, and a surface (upper surface) is provided with a step. In the embodiment, the sound absorbing body 10 has a substantially square shape in plan view, as shown in FIG. 3. Note that the shape of the sound absorbing body 10 can be any shape in plan view, such as a rectangular, polygonal, circular, or elliptical shape.

The sound absorbing body 10 is made of foamed resin. As the foamed resin, urethane foam, acrylic foam, silicone foam, styrene foam, foamed olefin (foamed PP, foamed PE), foamed PVC, foamed EVA, foamed PA, etc. can be used. For example, from the viewpoint of improving sound absorption, it is preferable to use foamed resin having an Asker C hardness of 5 to 40 degrees.

The sound absorbing body 10 includes a first surface 11 (upper surface in FIG. 2), a second surface 13 located on the opposite side to the first surface 11 (lower surface in FIG. 2), and a circumferential side surface 14 connecting the first surface 11 and the second surface 13. The first surface 11 is a covering surface that covers the object.

The first surface 11 has a shape that corresponds to the outer surface of the part of the object to be coated. In the embodiment, as shown in FIG. 2, the first surface 11 has a raised shape including a two-stage convex unit 12 including a first convex unit 12*a* and a second convex unit 12*b*. The first convex unit 12*a* protrudes upward from the central region while leaving a substantially fan-shaped flat unit, and the second convex unit 12*b* protrudes further upward from the first convex unit 12*a* on a side surface side of the sound absorbing body 10. Note that the object, such as a motor that is a drive source of a vehicle, has a complicated outer surface shape, and has at least a concave unit (not shown) on the outer surface. The first surface 11 merely needs to have at least a convex unit 12 corresponding to the outer surface shape (concave shape) of the object, and the shape and range of the convex unit 12 can be set arbitrarily according to the outer surface shape of the object.

Figure 4:
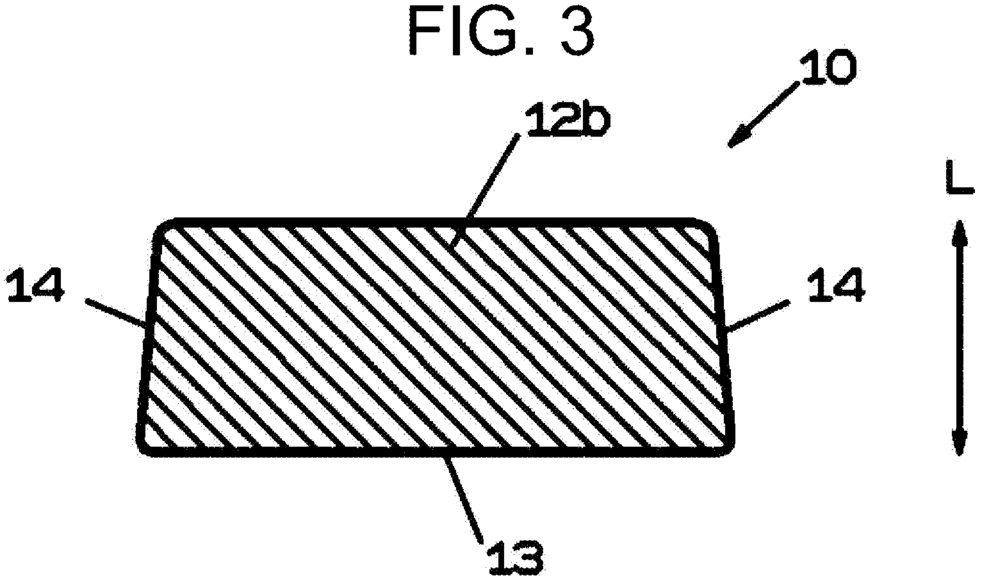
FIG. 4 is a cross-sectional view taken along line 4-4 in FIG. 3.
Figure 5:
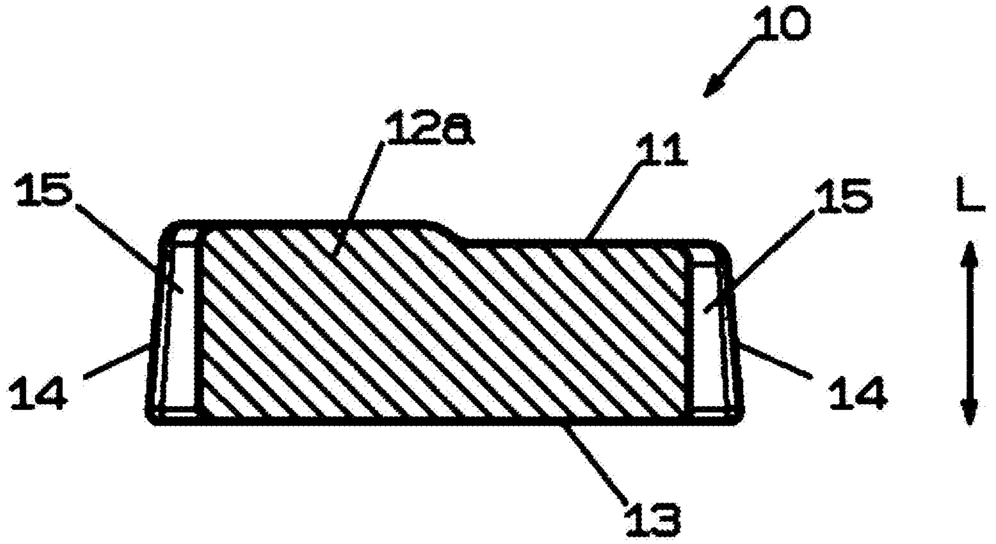
FIG. 5 is a cross-sectional view taken along line 5-5 in FIG. 3.

The second surface 13 has a planar shape, as shown in FIGS. 4 to 5. The second surface 13 is a surface opposite to the covering surface of the object, and the sound absorbing body 10 is covered with the cover body 20 from the second surface 13 side of the sound absorbing body 10. The second surface 13 is accommodated within the cover body 20 and is disposed in contact with a bottom unit 21 of the cover body 20, which will be described later, or with a slight gap therebetween.

As shown in FIG. 4, the circumferential side surface 14 is an inclined surface that slopes inward from the second surface 13 side toward the first surface 11 side in a cross section taken along a thickness direction L (up-down direction in FIG. 4) of the sound absorbing body 10. The circumferential side surface 14 is also an inclined surface that slopes inward from the second surface 13 side toward the first surface 11 side in a cross section (not shown) that is orthogonal to the cross section shown in FIG. 4. In other words, the four side surfaces of the circumferential side surface 14 are inclined surfaces such that the first surface 11 falls within the projection range of the second surface 13 when viewed from the second surface 13 side.

Note that the sound absorbing body 10 is foam-molded by injecting a foamed resin material into upper and lower molds. For example, a flat upper mold and a concave lower mold are used. Here, since the first surface 11 of the sound absorbing body 10 has the convex unit 12, when filling the tip end side of the convex unit 12 with foamed resin, a lower mold having a concave unit corresponding to the shape of the convex unit 12 on the bottom surface is used. In order to facilitate demolding after molding, the concave inner surface of the lower mold is an inclined surface. Therefore, the circumferential side surface 14 of the sound absorbing body 10 after demolding is an inclined surface corresponding to the concave inner surface of the lower mold.

As shown in FIGS. 2 to 3, in the circumferential side surface 14, fitting concave units 15 communicating in the thickness direction L of the sound absorbing body 10 are formed at substantially intermediate units of the four side surfaces, respectively. In the embodiment, the fitting concave unit 15 has a substantially semicircular shape in plan view that opens outward in the surface direction of the sound absorbing body 10. As described above, the circumferential side surface 14 is an inclined surface that slopes inward from the second surface 13 side toward the first surface 11 side of the sound absorbing body 10 in a cross section taken along the thickness direction L of the sound absorbing body 10 (up-down direction in FIG. 4), whereas the inner side surface of each of the fitting concave units 15 is a horizontal surface that extends along the thickness direction L of the sound absorbing body 10 in a cross section taken along the thickness direction L of the sound absorbing body 10 (up-down direction in FIG. 5), as shown in FIG. 5. In other words, the inner side surface of each of the fitting concave units 15 is not inclined from the second surface 13 side toward the first surface 11 side in the cross section taken along the thickness direction L of the sound absorbing body 10 but is parallel to the thickness direction L of the sound absorbing body 10.

Note that the fitting concave unit 15 can be formed by using, for example, a lower mold having a convex unit corresponding to the shape of the fitting concave unit 15 on the inner side surface as the lower mold used for molding the sound absorbing body 10 described above.

Figure 6:
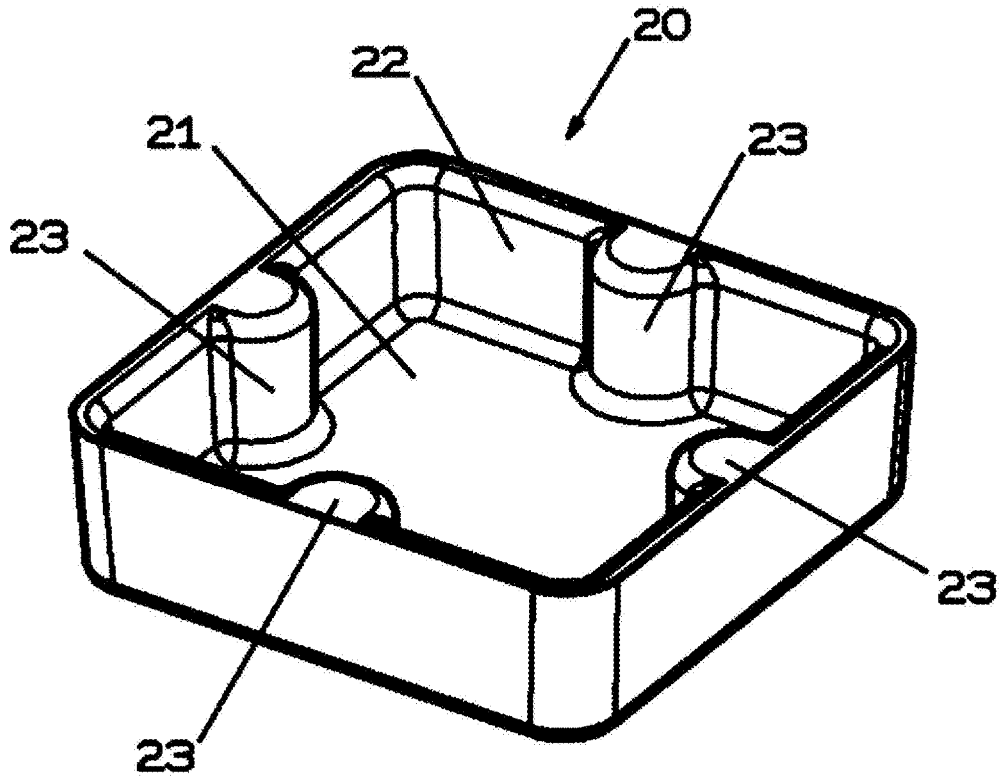
FIG. 6 is a perspective view of a cover body.

The cover body 20 is formed in a concave shape, as shown in FIG. 6. The cover body 20 has a concave bottom unit 21 and a side wall 22 that stands upright from the outer edge of the bottom unit 21 and forms a concave side unit. In the embodiment, the cover body 20 is formed so that the bottom unit 21 and the side wall 22 have substantially the same thickness. The cover body 20 is placed over the sound absorbing body 10 from the second surface 13 side, and is accommodated in a state where the second surface 13 of the sound absorbing body 10 is covered from the bottom unit 21, so the bottom unit 21 has a shape corresponding to the second surface 13 of the sound absorbing body 10. Note that the shape of the bottom unit 21 can be any shape that corresponds to the shape of the sound absorbing body 10, such as a rectangular, polygonal, circular, or elliptical shape in plan view.

The cover body 20 is made of foamed resin. As the foamed resin, urethane foam, acrylic foam, silicone foam, styrene foam, foamed olefin (foamed PP, foamed PE), foamed PVC, foamed EVA, foamed PA, etc. can be used. For example, from the viewpoint of protecting the sound absorbing body 10 from a flying object, it is preferable to use foamed resin having an Asker C hardness of 40 to 95 degrees. Note that depending on the usage environment, the hardness may be equivalent to the hardness of the sound absorbing body 10.

Figure 8:
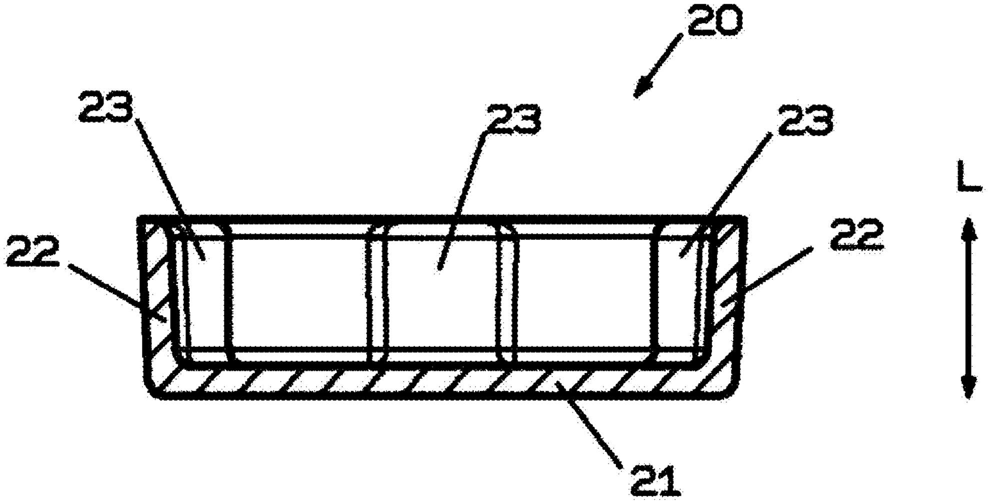
FIG. 8 is a cross-sectional view taken along line 8-8 in FIG. 7.

As shown in FIG. 8, the side wall 22 is an inclined surface that slopes outward in the surface direction of the cover body 20 from the bottom unit 21 side toward the tip end side in the cross section taken along the up-down direction (the thickness direction L of the sound absorbing body 10) in FIG. 8. In other words, when the sound absorbing body 10 is accommodated in the cover body 20, the side wall 22 is an inclined surface that slopes outward in the surface direction of the sound absorbing body 10 from the second surface 13 side to the first surface 11 side of the sound absorbing body 10. The side wall 22 is an inclined surface that slopes outward in the surface direction of the sound absorbing body 10 from the bottom unit 21 side toward the tip end side in a cross section orthogonal to the cross section shown in FIG. 8 as well. In other words, when the sound absorbing body 10 is accommodated in the cover body 20, the four walls of the side wall 22 are inclined surfaces that slope outward in the surface direction of the sound absorbing body 10 from the second surface 13 side toward the first surface 11 side of the sound absorbing body 10.

Note that the cover body 20 is foam-molded by injecting a foamed resin material into upper and lower molds. Since the cover body 20 is a concave member, when filling the bottom unit 21 of the cover body 20 with foamed resin, for example, a concave lower mold and an upper mold disposed in the concave unit of the lower mold are used. In order to facilitate demolding after molding, the concave inner surface of the lower mold and the side surface of the upper mold are both inclined surfaces. Therefore, the side wall 22 of the cover body 20 after demolding is an inclined surface corresponding to each of the concave inner surface of the lower mold and the side surface of the upper mold.

Figure 7:
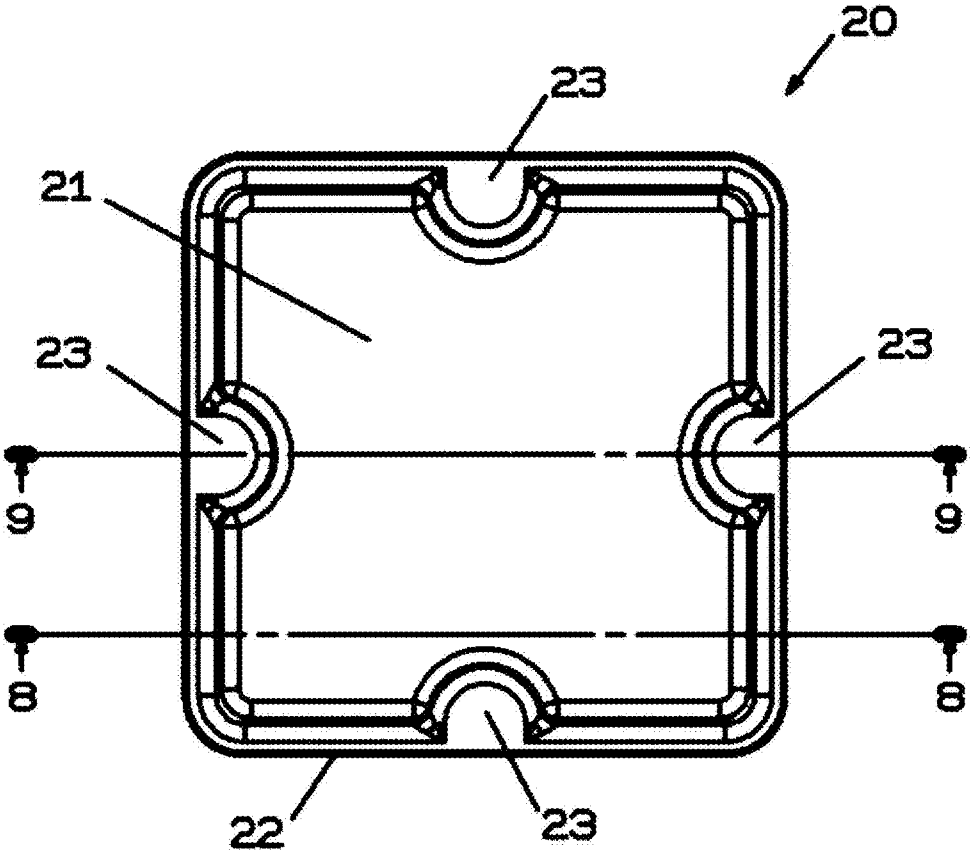
FIG. 7 is a plan view of the cover body.

As shown in FIGS. 6 to 7, on the inner surface of the side wall 22, fitting convex units 23 are formed at substantially intermediate units of the four walls, respectively, to protrude inward in the surface direction of the sound absorbing body 10 and to continue in the thickness direction L of the sound absorbing body 10 (up-down direction in FIG. 6). In the embodiment, the fitting convex unit 23 has a substantially semicircular shape in plan view. The fitting convex unit 23 is fitted into the fitting concave unit 15 of the sound absorbing body 10 when the sound absorbing body 10 is accommodated in the cover body 20, as will be described later. Therefore, the fitting convex unit 23 has a convex shape corresponding to the shape of the concave inner surface of the fitting concave unit 15 of the sound absorbing body 10 and is formed at a position facing each of the fitting concave units 15 of the sound absorbing body 10.

Figure 9:
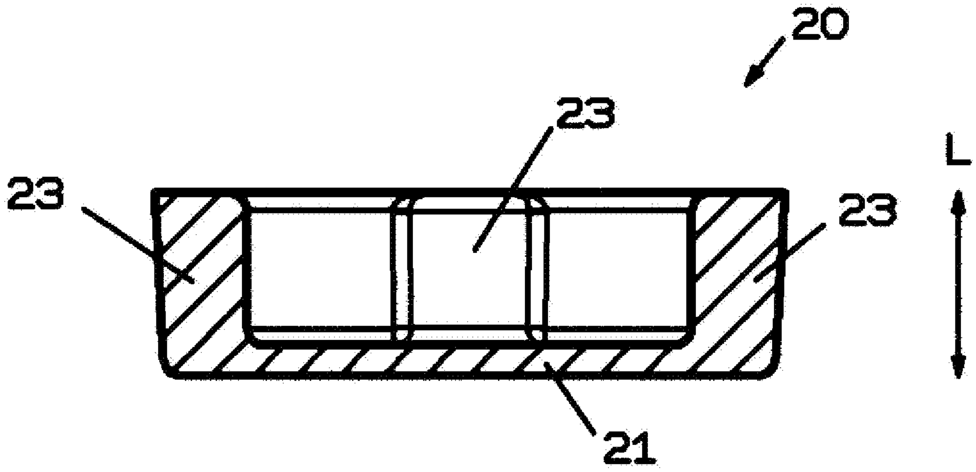
FIG. 9 is a cross-sectional view taken along line 9-9 in FIG. 7.

As described above, the side wall 22 is an inclined surface that slopes outward in the surface direction of the sound absorbing body 10 from the second surface 13 side toward the first surface 11 side of the sound absorbing body 10 in the cross section taking along the up-down direction (the thickness direction L of the sound absorbing body 10) in FIG. 8, whereas the outer side surface of each of the fitting convex units 23 is a horizontal surface that extends in the thickness direction L (up-down direction in FIG. 9) of the sound absorbing body 10 as shown in FIG. 9. In other words, the outer side surface of each of the fitting convex units 23 is not inclined from the second surface 13 side toward the first surface 11 side in the cross section taken along the thickness direction L of the sound absorbing body 10, but is parallel to the thickness direction L of the sound absorbing body 10.

Note that the fitting convex unit 23 can be molded by using an upper mold having a concave unit corresponding to the shape of the fitting convex unit 23 on the side surface as the upper mold used for molding the cover body 20 described above.

3. Integrated Configuration of Soundproof Member 1

The integrated configuration of the soundproof member 1 will be described with reference to FIGS. 10 to 12. The soundproof member 1 is integrated by covering the sound absorbing body 10 with the cover body 20. The cover body 20 is placed over the sound absorbing body 10 from the second surface 13 side, and the sound absorbing body 10 is accommodated in the cover body 20 with the first surface 11 of the sound absorbing body 10 exposed. Note that the sound absorbing body 10 may be inserted into the cover body 20 from the second surface 13 side and integrated.

Figure 10:
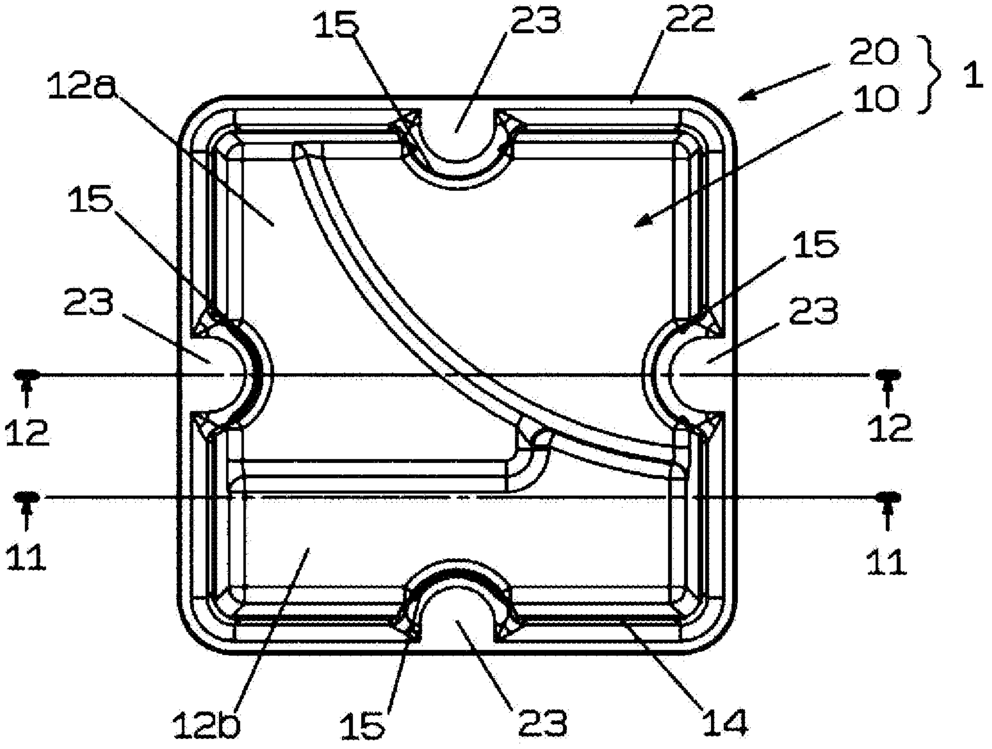
FIG. 10 is a plan view of the soundproof member 1.

As shown in FIG. 10, four fitting convex units 23 formed on the side wall 22 of the cover body 20 are fitted into four fitting concave units 15 formed on the circumferential side surface 14 of the sound absorbing body 10 and are integrated.

Figure 11:
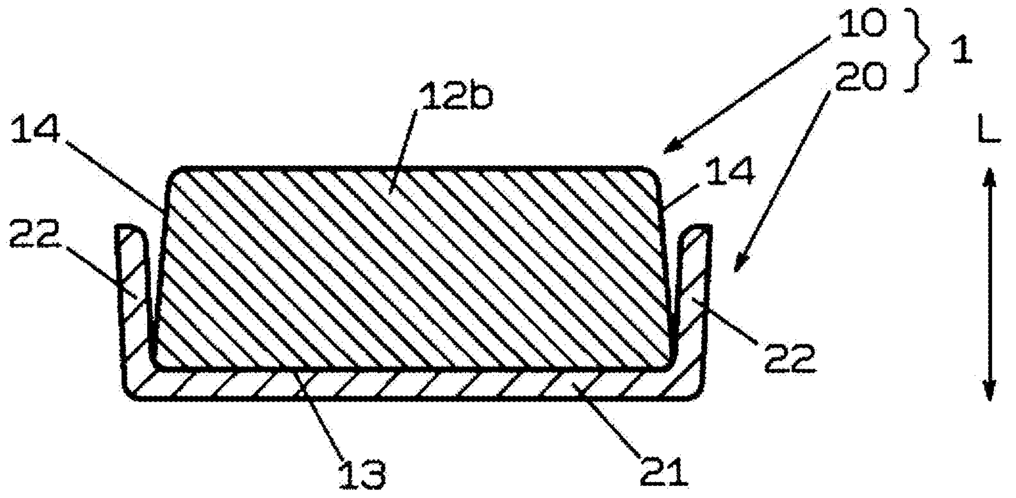
FIG. 11 is a cross-sectional view taken along line 11-11 in FIG. 10.

As shown in FIG. 11, the circumferential side surface 14 of the sound absorbing body 10 is an inclined surface that slopes inward from the second surface 13 side toward the first surface 11 side of the sound absorbing body 10 in a cross section taken along the thickness direction L (up-down direction in FIG. 11) of the sound absorbing body 10. On the other hand, as shown in FIG. 11, the side wall 22 of the cover body 20 is an inclined surface that slopes outward in the surface direction of the sound absorbing body 10 from the second surface 13 side toward the first surface 11 side of the sound absorbing body 10 in the cross section taken along the thickness direction L (up-down direction in FIG. 11) of the sound absorbing body 10. Therefore, in the accommodated state, the circumferential side surface 14 of the sound absorbing body 10 and the side wall 22 of the cover body 20 are accommodated so that the distance from each other increases from the second surface 13 side toward the first surface 11 side of the sound absorbing body 10.

Figure 12:
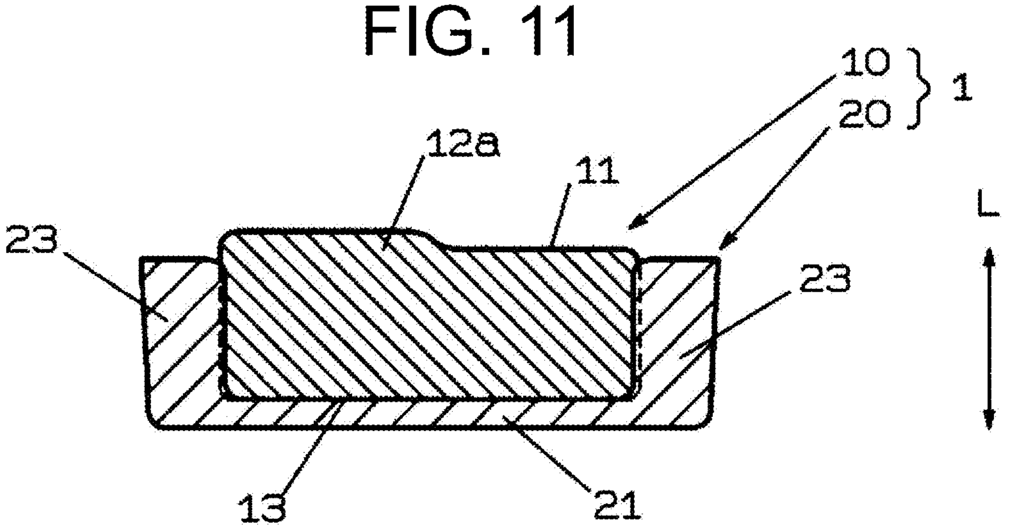
FIG. 12 is a cross-sectional view taken along line 12-12 in FIG. 10.

On the other hand, as shown in FIG. 12, the inner side surface of each of the fitting concave units 15 formed in the circumferential side surface 14 of the sound absorbing body 10 is not inclined from the second surface 13 side toward the first surface 11 side of the sound absorbing body 10 in the cross section taken along the thickness direction L (up-down direction in FIG. 12) of the sound absorbing body 10, but is parallel to the thickness direction L of the sound absorbing body 10. Further, as shown in FIG. 12, the outer side surface of each of the fitting convex units 23 formed on the side wall 22 of the cover body 20 is not inclined from the second surface 13 side toward the first surface 11 side of the sound absorbing body 10 in the cross section taken along the thickness direction L (up-down direction in FIG. 12) of the sound absorbing body 10, but is parallel to the thickness direction L of the sound absorbing body 10. Therefore, in the accommodated state, the inner side surface of each of the fitting concave units 15 and the outer side surface of each of the fitting convex units 23 are accommodated in contact with each other from the second surface 13 side toward the first surface 11 side of the sound absorbing body 10.

In the embodiment, in the state before being accommodated, as shown by the broken line in FIG. 12, the sound absorbing body 10 has a length between the outer side surfaces of two fitting convex units 23 located on opposite sides of each other in the surface direction of the sound absorbing body 10 set smaller than a length between the inner side surfaces of two fitting concave units 15 located on opposite sides of each other in the surface direction of the sound absorbing body 10. Therefore, in the accommodated state, as shown in FIG. 12, the sound absorbing body 10 is accommodated in a compressed state in the surface direction of the sound absorbing body 10 (direction orthogonal to the thickness direction L of the sound absorbing body 10) between two fitting convex units 23 located on opposite sides of each other. With the configuration, the compression reaction force of the sound absorbing body 10 is applied to the cover body 20, and the holding force of the sound absorbing body 10 to the cover body 20 is increased.

4. Effect of Soundproof Member 1

Since the sound absorbing body 10 and the cover body 20 constituting the soundproof member 1 are made of foamed resin, the overall weight can be reduced. Therefore, even if the soundproof member becomes larger, the burden of assembly work on a vehicle or the like can be reduced.

On the circumferential side surface 14 of the sound absorbing body 10 constituting the soundproof member 1, multiple fitting concave units 15 that open outward in the surface direction of the sound absorbing body 10 and communicate in the thickness direction L of the sound absorbing body 10 in which the sound absorbing body 10 is accommodated in the cover body 20 are provided at predetermined intervals in the circumferential direction. Further, on the inner surface of the side wall 22 of the cover body 20 constituting the soundproof member 1, multiple fitting convex units 23 that protrude inward in the surface direction of the sound absorbing body 10 and continues in the thickness direction L of the sound absorbing body 10 are provided in the circumferential direction. Since the fitting concave units 15 and the fitting convex units 23 are provided at positions facing each other in the circumferential direction, positioning during assembly is facilitated. Furthermore, since the fitting concave units 15 and the fitting convex units 23 can be integrated by fitting each other, manufacturing by a simple method can be attainable. Further, depending on the specifications, the sound absorbing body 10 and the cover body 20 can be manufactured by using the same manufacturing equipment and changing the mold or foaming raw material, so that the manufacturing process can be simplified.

Since the soundproof member 1 is configured to soundproof an object having a concave unit on the outer surface thereof, the first surface 11 of the sound absorbing body 10 has the convex unit 12 that is accommodated in the concave unit of the object. As described above, the plate-shaped sound absorbing body 10 having the convex unit 12 has a mold configuration that takes into consideration raw material filling and deformability during molding, so that the circumferential side surface 14 of the sound absorbing body 10 is an inclined surface that slopes inward from the second surface 13 side toward the first surface 11 side of the sound absorbing body 10. On the other hand, as described above, the cover body 20 which is a concave plate member has a mold configuration that takes into consideration raw material filling and demoldability during molding, so that the side wall 22 of the cover body 20 is an inclined surface that slopes outward in the surface direction of the sound absorbing body 10 from the second surface 13 side toward the first surface 11 side of the sound absorbing body 10. Therefore, in the accommodated state, the distance between the circumferential side surface 14 of the sound absorbing body 10 and the side wall 22 of the cover body 20 increases from the second surface 13 side toward the first surface 11 side of the sound absorbing body 10, so that the sound absorbing body 10 is structured to easily fall off from the cover body 20.

Here, the soundproof member 1 is provided with fitting concave units 15 that open outward in the surface direction of the sound absorbing body 10 and communicate in the thickness direction L of the sound absorbing body 10 on the four circumferential sides 14 of the sound absorbing body 10, respectively. Further, on the inner surface of the side wall 22 of the cover body 20, the fitting convex unit 23 that protrudes inward in the surface direction of the sound absorbing body 10 and continues in the thickness direction L of the sound absorbing body 10 is provided at a position facing each of the fitting concave units 15 of the sound absorbing body 10, and the fitting concave units 15 and the fitting convex units 23 are respectively fitted and integrated.

In this way, in the accommodated state, by compensating for the structure in which the distance between the circumferential side surface 14 of the sound absorbing body 10 and the side wall 22 of the cover body 20 increases from the second surface 13 side toward the first surface 11 side of the sound absorbing body 10, so that the sound absorbing body 10 is structured to easily fall off from the cover body 20 by fitting the fitting concave units 15 and the fitting convex units 23, respectively, the sound absorbing body 10 and the cover body 20 can be integrated to such an extent that handling is not hindered.

In particular, in the soundproof member 1 of the embodiment, the inner side surface of each of the fitting concave units 15 in the sound absorbing body 10 is not inclined from the second surface 13 side toward the first surface 11 side of the sound absorbing body 10 in the cross section taken along the thickness direction L of the sound absorbing body 10, but is parallel to the thickness direction L of the sound absorbing body 10. Further, the outer side surface of each of the fitting convex units 23 in the cover body 20 is not inclined from the second surface 13 side toward the first surface 11 side of the sound absorber 10 in the cross section taken along the thickness direction L of the sound absorbing body 10, but is parallel to the thickness direction L of the sound absorbing body 10. Therefore, in the accommodated state, since the inner side surface of each of the fitting concave units 15 and the outer side surface of each of the fitting convex units 23 are accommodated in contact with each other from the second surface 13 side toward the first surface 11 side of the sound absorbing body 10, falling off of the sound absorbing body 10 from the cover body 20 can be more effectively prevented.

5. Other Examples

The above embodiments can be modified and implemented as follows without technically contradicting each other.

In the soundproof member 1 of the above embodiment, the inner side surface of each of the fitting concave units 15 in the sound absorbing body 10 and the outer side surface of each of the fitting convex units 23 in the cover body 20 are parallel to the thickness direction L of the sound absorbing body 10 in the cross section taken along the thickness direction L of the sound absorbing body 10, but the inner side surface of each of the fitting concave units 15 in the sound absorbing body 10 and the outer side surface of each of the fitting convex units 23 in the cover body 20 may be inclined surfaces that are inclined with respect to the thickness direction L of the sound absorbing body 10 in the cross section taken along the thickness direction L of the sound absorbing body 10. For example, as in the above embodiment, the length between the outer surfaces of the circumferential side surfaces 14 located on opposite sides of the sound absorbing body 10 is set larger than the length between the inner surfaces of the side walls 22 located on opposite sides of the cover body 20, or the shape of the fitting convex unit 23 is set larger than the shape of the fitting concave unit 15, and in the accommodated state, a part of the outer side surface of the fitting convex unit 23 may be set to be in contact with a part of the inner side surface of the fitting concave unit 15.

In the soundproof member 1 of the above embodiment, the sound absorbing body 10 and the cover body 20 are each provided with four fitting concave units 15 and four fitting convex units 23. At least two fitting concave units 15 and at least two fitting convex units 23 may be provided. For example, when the sound absorbing body 10 has a rectangular shape in plan view, the fitting concave unit 15 can be provided in each of two adjacent circumferential sides 14 among the four circumferential sides 14 of the sound absorbing body 10, and the fitting convex unit 23 can be provided in each of two adjacent side walls 22 facing the respective fitting concave units 15 among the four side walls 22 of the cover body 20. Further, when the sound absorbing body 10 has a rectangular shape in plan view, the fitting concave units 15 can be provided in two of the four circumferential sides 14 of the sound absorbing body 10 that are disposed on opposite sides, respectively, and the fitting convex units 23 can be provided in two of the four side walls 22 of the cover body 20 that are located opposite to the respective fitting concave units 15, respectively.

In the soundproof member 1 of the above embodiment, the fitting concave unit 15 (sound absorbing side fitting concave unit) is provided on the circumferential side surface 14 of the sound absorbing body 10, and the fitting convex unit 23 (cover side fitting convex unit) is provided on the side wall 22 of the cover body 20. However, a fitting convex unit (sound absorbing side fitting convex unit) may be provided on the circumferential side surface 14 of the sound absorbing body 10, and a fitting concave unit (cover side fitting concave unit) may be provided on the side wall 22 of the cover body 20. In this case, a cover side fitting concave unit can be formed in the side wall 22 of the cover body 20 by increasing the thickness of the side wall 22 with respect to the cover body 20 of the embodiment described above. Note that the sound absorbing side fitting convex unit and the cover side fitting concave unit have the same structure as the above-mentioned fitting convex unit 23 and the fitting concave unit 15, but the cover side fitting concave unit can be arbitrarily designed depending on the thickness of the side wall 22, and the sound absorbing side fitting convex unit may have a shape corresponding to the cover side fitting concave unit.

Moreover, the sound absorbing body may be provided with both a sound absorbing side fitting concave unit and a sound absorbing side fitting convex unit, and the cover body may be provided with both a cover side fitting convex unit and a cover side fitting concave unit so that the fitting units are fitted into each other.

In the soundproof member 1 of the above embodiment, the fitting concave unit 15 is configured to communicate with the entire thickness direction of the sound absorbing body 10, and the fitting convex unit 23 is configured to be continuous throughout the thickness direction of the sound absorbing body 10. However, the fitting concave unit 15 and the fitting convex unit 23 may be provided merely in the area of the second surface 13 of the sound absorbing body 10. Further, the shape of the fitting concave unit 15 and the shape of the fitting convex unit 23 are not limited to a substantially semicircular shape in plan view, but can be any shape as long as the shapes can be fitted into a concave shape or a convex shape.

What is claimed is:

1. A soundproof member, configured for covering an object having a concave unit on an outer surface thereof, comprising:

a sound absorbing body, being a plate-shaped member made of foamed resin and comprising a first surface which has a convex unit accommodated in the concave unit of the object and configured to cover an outer surface of the object, a second surface which is a surface opposite to the first surface, and a circumferential side surface which connects the first surface and the second surface and is an inclined surface that slopes so that the first surface falls within a projection range of the second surface when viewed from the second surface side; and a cover body, being a concave member made of foamed resin and comprising a bottom unit which covers the second surface of the sound absorbing body and a side wall which stands upright from an outer edge of the bottom unit toward the first surface side of the sound absorbing body so as to slope outward in a surface direction of the second surface of the sound absorbing body, and surrounds the circumferential side surface of the sound absorbing body, wherein the second surface of the sound absorbing body being covered by the bottom unit of the cover body has a planar shape, a plurality of fitting concave units that open outward with respect to a center the sound absorbing body in the surface direction of the second surface of the sound absorbing body and communicates in a thickness direction of the sound absorbing body are provided at predetermined intervals in a circumferential direction on the circumferential side surface of the sound absorbing body, a plurality of fitting convex units that protrude inward towards a center of the cover body in the surface direction of the second surface of the sound absorbing body and continues in a thickness direction of the cover body are provided at positions facing the plurality of fitting concave units in the circumferential direction on an inner surface of the side wall of the cover body, the thickness direction of the cover body being the same as the thickness direction of the sound absorbing body, and the fitting concave units provided on the sound absorbing body and the fitting convex units provided on the cover body have mutually compensating shapes so that the fitting concave units and the fitting convex units are respectively fitted and integrated with one another as the sound absorbing body and the cover body are assembled with each other.

2. The soundproof member according to claim 1, wherein an inner side surface of the fitting concave unit is parallel to the thickness direction of the sound absorbing body, and an outer side surface of the fitting convex unit is parallel to the thickness direction of the sound absorbing body.

3. The soundproof member according to claim 1, wherein the sound absorbing body is a rectangular plate-shaped member, and the fitting concave unit is provided on each of the two circumferential side surfaces adjacent in a circumferential direction of the sound absorbing body.

4. The soundproof member according to claim 1, wherein the sound absorbing body is a rectangular plate-shaped member, and the fitting concave unit is provided on each of the two circumferential side surfaces that are disposed on opposite sides in the surface direction of the sound absorbing body.

5. The soundproof member according to claim 4, wherein a length between outer side surfaces of the two fitting convex units disposed on opposite sides in the surface direction of the second surface of the sound absorbing body is set smaller than a length between inner side surfaces of the two fitting concave units disposed on opposite sides in the surface direction of the second surface of the sound absorbing body.

6. A soundproof member, configured for covering an object having a concave unit on an outer surface thereof, comprising:

a sound absorbing body, being a plate-shaped member made of foamed resin and comprising a first surface which has a convex unit accommodated in the concave unit of the object and configured to cover an outer surface of the object, a second surface which is a surface opposite to the first surface, and a circumferential side surface which connects the first surface and the second surface and is an inclined surface that slopes so that the first surface falls within a projection range of the second surface when viewed from the second surface side; and a cover body, being a concave member made of foamed resin and comprising a bottom unit which covers the second surface of the sound absorbing body and a side wall which stands upright from an outer edge of the bottom unit toward the first surface side of the sound absorbing body so as to slope outward in a surface direction of the second surface of the sound absorbing body, and surrounds the circumferential side surface of the sound absorbing body, wherein the second surface of the sound absorbing body being covered by the bottom unit of the cover body has a planar shape, a plurality of sound absorbing side fitting convex units that protrude outward with respect to a center of the sound absorbing body in the surface direction of the second surface of the sound absorbing body or a plurality of sound absorbing side fitting concave units that open inward with respect to the center of the sound absorbing body in the surface direction of the sound absorbing body are provided at predetermined intervals in a circumferential direction on the circumferential side surface of the sound absorbing body, and a plurality of cover side fitting concave units that open inward with respect to a center of the cover body in the surface direction of the second surface of the sound absorbing body and fit opposite to the sound absorbing side fitting convex units or a plurality of cover side fitting convex units that protrude outward with respect to the center of the cover body in the surface direction of the second surface of the sound absorbing body and fit opposite to the sound absorbing side fitting concave units are provided in the circumferential direction on an inner surface of the side wall of the cover body, wherein the sound absorbing side fitting convex units and the cover side fitting concave units have mutually compensating shapes so that the sound absorbing side fitting convex units and the cover side fitting concave units are respectively fitted and integrated with one another as the sound absorbing body and the cover body are assembled with each other, or the sound absorbing side fitting concave units and the cover side fitting convex units have mutually compensating shapes so that the sound absorbing side fitting concave units and the cover side fitting convex units are respectively fitted and integrated with one another as the sound absorbing body and the cover body are assembled with each other.

* * * * *